United States Patent [19]
Toivola

[11] Patent Number: 6,081,515
[45] Date of Patent: Jun. 27, 2000

[54] METHOD AND ARRANGEMENT RELATING TO SIGNAL TRANSMISSION

[75] Inventor: Peter Toivola, Vällingbacken, Sweden

[73] Assignee: Telefonaktiebolaget LM Ericsson, Stockholm, Sweden

[21] Appl. No.: 08/873,697

[22] Filed: Jun. 12, 1997

[30] Foreign Application Priority Data

Jun. 12, 1996 [SE] Sweden .................................. 9602311

[51] Int. Cl.[7] .............................. H04H 1/00; H04B 7/185
[52] U.S. Cl. ........................... 370/339; 455/562; 455/561
[58] Field of Search ................... 370/277, 281, 370/339; 455/561, 562, 575, 90, 13.3, 19, 82, 107, 121, 197.1; 342/73, 74, 373, 374; 343/700 MS

[56] References Cited

U.S. PATENT DOCUMENTS

| | | | |
|---|---|---|---|
| 5,115,248 | 5/1992 | Roederer | 342/373 |
| 5,210,541 | 5/1993 | Hall | 343/700 MS |
| 5,475,394 | 12/1995 | Kohls | 343/846 |
| 5,539,415 | 7/1996 | Mertzen | 343/700 MS |
| 5,576,721 | 11/1996 | Hwang | 343/753 |
| 5,596,329 | 1/1997 | Searle | 342/374 |
| 5,602,555 | 2/1997 | Searle | 455/562 |
| 5,603,089 | 2/1997 | Searle | 455/562 |
| 5,714,957 | 2/1998 | Searle | 342/374 |
| 5,734,345 | 3/1998 | Chen | 342/74 |

FOREIGN PATENT DOCUMENTS

| | | |
|---|---|---|
| 687 031 | 12/1995 | European Pat. Off. . |
| WO95/31866 | 11/1995 | WIPO . |

*Primary Examiner*—Ajit Patel
*Assistant Examiner*—Ricardo M. Pizarro
*Attorney, Agent, or Firm*—Burns, Doane, Swecker & Mathis, L.L.P.

[57] ABSTRACT

The present invention relates to an arrangement at transmission of a number of signals each having a frequency component, between a base station unit and an antenna arrangement having a number of radiation element. The base station unit includes a combiner unit in which signals containing a frequency component are combined to a multi-frequency signal which is transmitted to the antenna arrangement (20). This includes a power dividing unit (3) in which the multi-frequency signal is divided into a number of, preferably similar multi-frequency subsignals and a number of controllable filter arrangements $(4_1, \ldots, 4_n)$ for extracting a number of signals essentially consisting of a frequency from multi-frequency subsignals. Moreover, the antenna arrangement includes a number of amplification devices $(5_1, \ldots, 5_n)$, in which single-frequency signals are amplified for feeding to a number of radiation elements $(6_1, \ldots, 6_n)$.

30 Claims, 7 Drawing Sheets

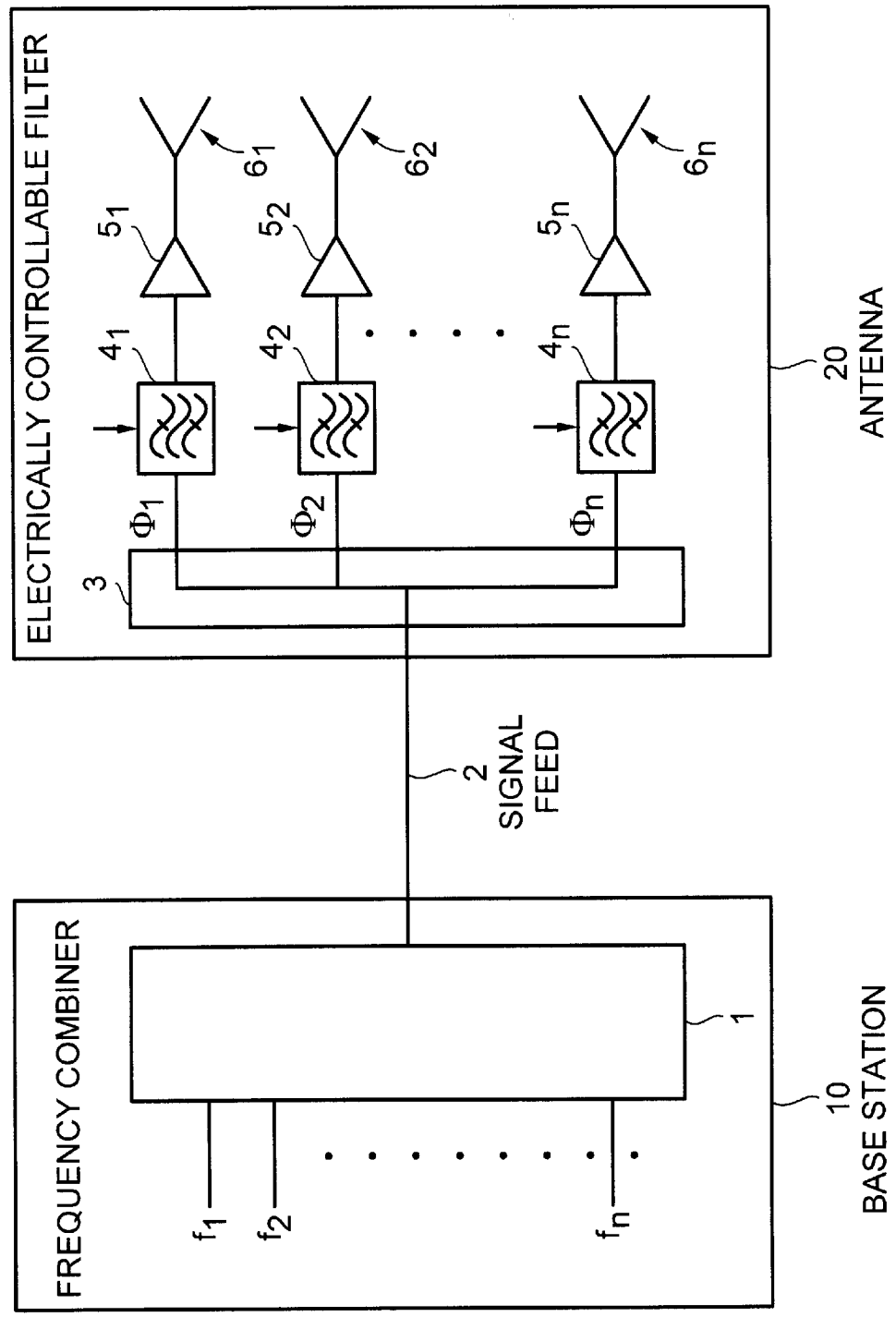

7/21 CELL PATTERN CHANNEL REUSE

METHOD AND ARRANGEMENT RELATING TO SIGNAL TRANSMISSION

TECHNICAL FIELD

The present invention refers to a method and an arrangement relating to transmission of a number of signals, each signal containing a frequency component, for example between a base station in a mobile communications system provided with an antenna device. The invention also refers to an antenna device which for example may be intended for a radio base station where to said antenna device a multi-frequency signal, i.e. a signal containing a number of different frequency components is supplied. The arrangement refers to a base station arrangement including a base station unit having a number of transceivers forming an interface to a number of mobile stations as well as an antenna arrangement, in which the signals are transmitted between the base station unit and the antenna arrangement.

PRIOR ART

The basic parts in a mobile communication system are generally a number of mobile switching centres, base stations as well as the mobile stations, which for instance can be so-called portable telephones, a vehicle mounted stations and so on. Mobile switching centres (MSC) provide interface for instance to a public telecommunications network. To a mobile switching centre a number of base stations are connected through digital or analogous line; the transmission media may be twin cable, coaxial cable, optical cable or radio relay system.

A base station can for instance serve one or more cells; naturally, one condition is, that it is a cellular system. A cell is thereby a geographical area within which a call can be performed with use of one and same radio channel. The cells that are connected to the same mobile switching centre forms a so-called MSC-area. This area may in turn be divided in several, so-called local station areas, subscription information is combined in so-called home registers fixed in or in connection with the mobile switching centres. The base station itself contains a number of channel units, each being equipped with a radio transmitter, radio receiver and a control unit, where the latter is used for instance for computer communication with the mobile switching centres and data signalling with the mobile stations. When a call between a mobile subscriber and a permanent subscriber or another mobile subscriber is in progress, speech is transmitted to the radio connection between the mobile station and a speech channel unit in a base station, which is close to the mobile station. The base station can consequently communicate with the mobile stations, which are within a predetermined area in the proximity of the base station.

A base station can cover one or several areas depending on which type of antenna is used by the base station. These areas or cells can for instance consist of so-called omnidirectional cells or sector cells. A so-called omnidirectional antenna transmits equally in all directions and a circular area that surrounds the base station is then covered. If the cells are so-called sector cells, the base station is usually provided with three directional antennas each of which covers a 120° sector cell. In this case, certain channel units are connected to antennas that cover a first antenna group sector cell while other channel units belong to the second and third antenna group, respectively, and the base station consequently serves three sector cells. Depending on the practical circumstances, of course it does not need to be just three sector cells; if for instance a street is to be covered, perhaps only one sector is needed.

The channels, which are used for communication between a mobile station and a base station are partly control channels essentially used for call connection, partly analogous or digital channels for speech and data. Generally, all radio channels work in one and same cell with different frequencies. Also, adjacent cells use different frequencies; otherwise, interference would appear because of the overlap between the cells. However, same radio channels are used for cells that are geographically enough far from each other, which is called channel reuse.

For analogous cellular mobile systems, the frequency division multiaccess (FDMA) is used while in the digital systems, for instance GSM, ADC and so on, time division multiaccess (TDMA) is used for the radio connection. Also, CDMA (Code Division Multiple Access) of course can be used.

For instance, in the GSM-system, the above described base system is divided partly in a base station switching center (BSC) provided with a number of base transmitter stations (BTS). A group of BTS's are controlled by a BSC, there the BSC, for example controls such functions as handover and power supply and so on. Each cell has a BTS that uses a set of radio channels, which, as mentioned above, are different from the channels that are used in adjacent cells. In this case, the BTS is arranged in connection to each antenna arrangement. The base station or BTS contains all radio and transmission interface equipment that are necessary in the radio installation, no matter if one or more cells are covered. In the base stations (BS or BTS) the information is amplified into a number of radio frequency carriers and transmitted to a receiver. As there can be found many mobile stations, a great number of carrier frequencies are also required. This in turn results in that amplification devices such as combiners, which combine the signals into different frequencies, as well tend to become expensive. Furthermore, the base stations become unnecessary large.

At present, different arrangement are known. In a known device, for example illustrated in FIG. 1, a so-called "single carrier power amplification" (SCPA) is used. Thereby each signal frequency component $f_{1A}, \ldots, f_{nA}$ is amplified in a high efficiency SCPA, which includes a number of separate frequency components are combined in a filter combiner unit $1A_0$ where the filters 7, shown in the figure, are used to filter interference and the like. Consequently, a multi-frequency signal is obtained, which is fed to an antenna $6A_0$. In another known device, which is illustrated very schematically in FIG. 2, first a number of signal frequency components $f_{1B}, \ldots, f_{nB}$ are combined in a combiner $1B_0$ to a multi-frequency signal. The multi-frequency signal is then amplified into a "multi carrier power amplifier" (MCPA) $5B_0$ after which it is fed to an antenna $6B_0$.

However, in view of the increasingly projected mobile communications networks, great demands are made upon base stations. For instance, in cities, it is required that they are not too large and clumsy, do not have too high weight and so on. Moreover, due to aesthetic reasons, it can be important that the base stations are held small and light. At present, complying with these objects with known devices are difficult. Moreover, the number of signals which must be handled rapidly increases successively, which in turn is a complicating factor, which also makes it more difficult to meet the above-mentioned objects. Additionally, in the cities different special demands are made depending on the current buildings etc., in an area to provide the desired coverage areas.

EP-A-0 687 031 discloses a base station antenna arrangement where a mast or a building is equipped with a group antenna with corresponding antenna electronic unit including beam formers, diplexers and amplifiers. The antenna electronic unit via an electronics cabinet is connected to a base station, which in turn is provided to a base station switching center BSC. Because of the reasons discussed above, he antenna arrangement becomes too complex, bulky and costly.

SUMMARY OF THE INVENTION

Consequently, what is needed, is an arrangement as described in the beginning which can amplify and combine a number of signals having different frequencies without being complex. Further, an arrangement which is flexible and has high performance is needed. There is a need for an arrangement, which does not consists of complicated and expensive components but includes relatively simple and cheap components, for instance amplification devices can be used. Moreover, an arrangement that is cheap and has a small size is needed so that it is not bulky or clumsy to handle, e.g. when installing and maintaining in the urban environment. Furthermore, there is a need for an arrangement, which only needs light DC-power supply. Additionally, there is a special need for an arrangement that can be adapted to alternating input frequencies and which is flexible.

Therefore, the present invention provides an arrangement where a combiner unit is arranged in, for instance, a base station in which a number of signals containing different frequency components are combined to a multi-frequency signal, which should be transferred to an antenna arrangement. The antenna arrangement is equipped with a power dividing unit to divide the transmitted multi-frequency signal in a number of preferably similar subsignals. Moreover, the antenna arrangement includes a number of controllable filter arrangements, which from the different subsignals, all of which are similar and multi-frequency signals, filter a frequency for each. Generally, for simplicity reason in the following, what are called single-frequency signals, are not clean single-frequency signals but they often contain some other components in some extension. By means of the filters, the signal levels of these are reduced. Furthermore, in the antenna arrangement, a number of amplification devices are provided in which said filtered frequency signals are amplified before they are fed into a number of radiation elements. Advantageously, the combiner consists of a passive network. Multi-frequency signals transmitted between the base station and the antenna arrangement can for instance be transferred via a signal feed arrangement, which may consist of a coaxial cable, but it also can consist of a waveguide or the like. In the antenna arrangement provided a dividing unit consists of a passive power divider network according to an advantageous embodiment. The tunable filter arrangements, in an extraordinarily advantageous embodiment, consist of electrically controllable filters. Alternatively, they could consist of optically controllable filters or filters being controllable in some other way. In a special embodiment, a separate amplification device is arranged to each filter arrangement for amplification of only the signal provided from each filter arrangement which in turn is fed to an amplification device belonging to the radiation elements.

According to an alternative embodiment, an amplification device is common for two or more filter arrangements. Further, in another embodiment, a single-frequency signal may be fed into more than one radiation element via a number of amplification devices.

Consequently, by means of for instance electrically controllable bandpass filters for each filter a frequency can be tuned while essentially all others are filtered away. The radiation elements consist of antennas such as for instance conventional dipoles. In an alternative embodiment, they can consist of microstrip devices, for example so-called patch antennas or slot antennas which consist of a number of slots in a copper surface. The microstrip device can be of arbitrary form. According to a different embodiment, at least some filters or all of the filters can be tuned to different frequencies.

In a special embodiment all filter arrangements can be tuned to one and same frequency. Thus, an amplified signal and a high output power in that frequency are obtained. Alternatively, some of filter arrangements can be tuned in to one and same frequency while others are tuned in to different frequencies, as discussed above. In this way, it is possible to distribute the available output power through desired method to desired frequencies. It may be obvious that there are a great number of variation possibilities.

Beam forming can be carried out by variation of the phase. For adjustment, e.g. if a radiation element is defective, the amplitude (and the phase) can be varied for single-frequency signals so that the desired beam form can be obtained.

Due to existing objects regarding the small, light weight and cheap antenna arrangements that can handle a multi-frequency signal which for instance contains a large number of frequencies, there is provided by the invention an antenna arrangement in which a power dividing unit is arranged, in which the multi-frequency signal is divided in a number of similar multi-frequency subsignals. Furthermore, said number of controllable filter arrangements through which desired single-frequency signals could be obtained from the subsignals include as well a number of amplification devices for separate amplification of the single frequency signals. Suitably, the filter arrangements may consist of electrically controllable filters. Specially, the relationship, number of electrically controllable filters—number of amplification devices be 1:1, i.e. an amplification device is arranged for each electrically controllable filter, since there may be an antenna element provided for each amplified single-frequency signal.

The invention also refers to a base station arrangement including a base station unit with a number of transceivers, depending on the system a base station or a base transceiver station (GSM) that forms an interface for a number of mobile stations and an antenna arrangement where signals are transmitted between the base station unit and the antenna arrangement via a signal transmission device. In the base station unit, a power combiner unit for combining a number of signals of different frequency to a multi-frequency signal for transmission to the antenna arrangement may be found. This in turn, includes a power dividing unit in which the transmitted multi-frequency signal is divided to a number of similar multi-frequency signals and through a number of controllable filter arrangements a number of single-frequency signals are filtered, which are separately amplified and fed to a number of antenna elements. For instance, through the electrically controllable filters the requested signal frequencies or desired signal frequency can be tuned.

According to the invention, there is also a cellular mobile communications system provided with a number of base stations each of which cover one or more cells. Each base station includes a firm radio base station unit and an antenna arrangement for communication with the mobile stations within the or those cells which are covered by the base station in a number of carrier frequencies.

In the radio base station unit (or alternatively, arranged in the antenna arrangement or separately) there is a combiner device in which a number of signals are combined to a multi-frequency signal. In an antenna arrangement there is a device for dividing the multi-frequency signal in a number of subsignals and there is also provided a number of, for example electrically controllable filter arrangements through which one or more desired frequencies can be tuned. These are amplified, preferably into amplification devices arranged separately in the antenna arrangement provided for feed to the radiation elements likewise separately arranged in the antenna arrangement, preferably a radiation element for each signal from each amplification device.

According to an advantageous embodiment of the invention monolithic integrated microwave circuits are used.

It is an advantage of the present invention to accomplish performance and flexibility which are better than the known devices. As only some of single-frequency signals are needed to be amplified, simple amplification devices can be used, which clearly is an advantage. Through the use of the controllable filters monolithic integrated microwave circuits (MMIC, Microwave Monolithic Integrated Circuits) are used, which is a considerable advantage. Moreover, it is very important that, through the use of (similar) tunable filters, one can change the characteristic of the antennas, and generally through the invention simple components can be used. Through the design it is also easy to repair or change, for instance a filter or an amplification device when an antenna malfunctions etc., as well as take measures at loss of, for instance a filter or an amplification device by simply directing the other filters through a suitable method so that desired beam form is obtained. Furthermore, it is an advantage that the base stations and base stations antenna arrangements, respectively, for instance in cities and other places where it is desirable that these small and aesthetic, can be the stations or the antennas having these features. Moreover, it is a technical as well as an economical advantage that the combiner as well as the power divider are simple branch networks without intelligence.

In a special embodiment an antenna for each frequency is used, which is remarkably advantageous since it results in a system that is simple with regard to frequency feeding etc.

BRIEF DESCRIPTION OF THE DRAWINGS

In the following, the invention will be described in a non limiting way, with reference to the drawings, on which:

FIG. 3 schematically shows an example of an arrangement according to invention,

DETAILED DESCRIPTION OF THE INVENTION

Figure 1:
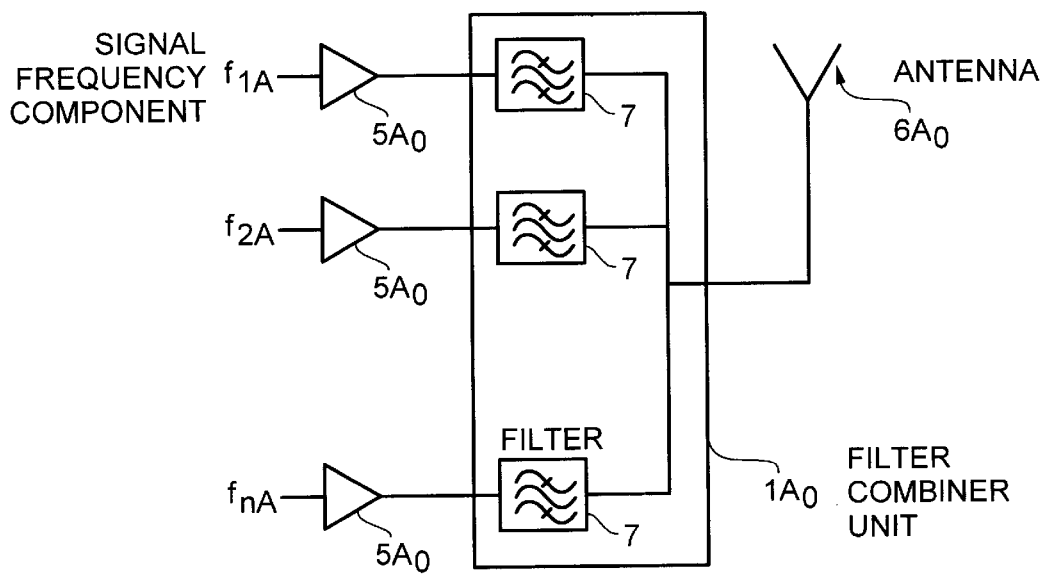
FIGS. 1 and 2 show examples of prior art devices.
Figure 2:
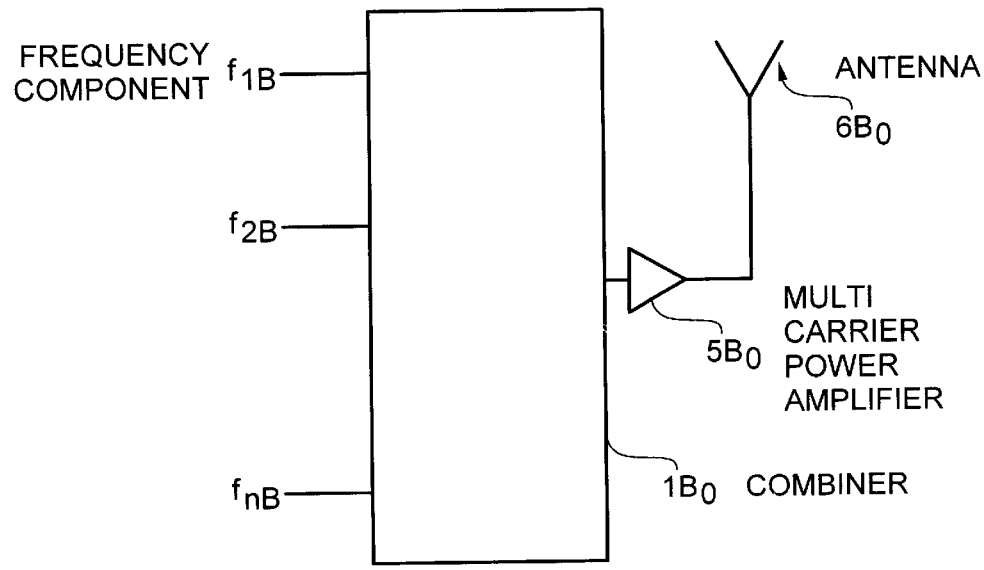

FIG. 3 shows a first embodiment of the invention concerning an arrangement 100 for transmission of a number of signals each containing a frequency component between a base station unit 10 and an antenna arrangement 20. A number of signals of different frequency $f_1, \ldots, f_n$ are supplied to a combiner device 1 being arranged in a base station 10. With the base station is meant, for instance a BTS such as in the GSM system or base station (the corresponding antenna is designated here by separate antenna arrangement 20) designed, for instance in ADC (D-AMPS etc.) where the connection functions as well as the transmitter/receiver functions themselves are provided in the base station itself contrary to GSM where a number of base transmitter stations BTS are provided at a base station switch central BSC. The combination of the different frequency components $f_1, \ldots, f_n$ is carried out in a passive combiner network 1.

The power dividers, i.e. inverted combiner, of different types are known and they are used when power needs to be divided to obtain a good impedance adaptation at a number of different ports. An example of a power divider is so-called resistive power divider. An advantage with similar circuits is that they have a broad operation bandwidth, whereas the insulation values between out ports are relatively low. Moreover, they have rather high input losses. A so-called reactive power divider is advantageous in comparison with the former, as they have lower input losses and higher insulation between the ports. However, a drawback is that they have a considerable smaller operation bandwidth. An example of such a power divider is a so-called Wilkinson power divider. The reactive power dividers with a considerable higher operation bandwidth are however also known. Depending on the function and demands, suitable power dividers may be selected.

By the combination in the combiner device I a multi-frequency signal is received. This is fed to the antenna arrangement 20 via a signal feed arrangement 2. This signal feed arrangement 2 may for instance consist of a coaxial cable but may also consist of for example a waveguide, stripline. The usage depends on the frequency and length. For instance it can be a question of a distance between about 50–70 m, however, the invention is obviously not limited to similar designs; the distance itself is insignificant for the present invention. The coaxial cable can be used to avoid great losses.

In the antenna arrangement 20 a power combiner 3 is arranged. A power combiner is basically same as a power divider, as discussed above, with the difference that it is connected in a contrary way, i.e. when a signal arrives at a passive branch network, it is divided in a number of subsignals. Consequently, in that illustrated case a multi-frequency signal arrives, in which in the power divider 3 is divided in a number of essentially similar multi-frequency subsignals $\phi_1, \phi_2, \ldots, \phi_n$. However, they may be different, but advantageously they are similar. The antenna arrangement 20 includes also a number of electrically controllable filters $4_1, 4_2, \ldots, 4_n$, which preferably can be of the same kind, to each of which a multi-frequency subsignal is fed $\phi_1, \ldots, \phi_n$. The electrically controllable filters $4_1, \ldots, 4_n$ are so tuned that from everyone a signal having desired frequency is received. In each electrically controllable filter all remaining frequencies are filtered away except just the one which is preferred for each filter. Consequently, a number of single frequency signals which preferably are identical are received. However, the invention is not limited to that they are identical, but they can also be different. These signals are amplified in an amplification device arranged for each electrically controllable filter $5_1, \ldots, 5_n$ (where said amplification devices according to the advantageous embodiments can be equivalent) after which the outputted amplified single-frequency signal from each amplification device is fed to each of the radiation elements $6_1, \ldots, 6_n$ which are provided in connection with each amplification device.

With frequency signals is meant, the frequencies in which the frequency components, besides the one for which the filter is tuned in, either is filtered away entirely (ideally all are filtered away completely, but it is not always possible in real devices) or are attenuated, i.e. its signal strength level is decreased. This is enough to be able to use considerably simpler and cheaper amplifier than what has been possible hitherto. It depends on that the amplifiers must be dimensioned for the peak-to-peak amplitude for the vector sum (potentials) of the frequency components which the signal contains. Without the filter, great demands are made upon the linearization system of the amplifiers, transistors and so on, which then becomes complex. Moreover, the power consumption is high. However, if the filter can be tuned so that a number of frequency components are filtered away and the signal levels of the adjacent frequency components are decreased, simple amplification devices can be used, specially the MMIC-technic can be employed.

The power dividing device 3 is a simple branch network without intelligence and all frequencies are distributed to each branch. The electrically controllable filter, which is used, can be of a known type. It is essential that small electrically controllable filters are used but those are in present-day situation, generally available. Each filter consequently lets through a signal with the required frequency. Thereby very simple amplification devices $5_1, \ldots, 5_n$ can be used, as discussed above. By using controllable filters one can consequently control and amend the characteristics of the antenna. Through the design described in the invention it is easy to take action or change or amend the frequency setting of other filters, if for instance a filter breaks down and so on, and that allows the use of considerably simpler components than in the known devices. Of course, in same way the amplification devices, antennas etc. can be replaced.

Moreover, the antenna arrangements can be small, for example be integrated in the amplification devices, in particular in urban environment or the like. In the shown embodiment, each radiation element $6_1, \ldots, 6_n$ has its frequency. The radiation elements $6_1, \ldots, 6_n$ can for instance consist of conventional dipoles. Alternatively, so-called microstrip technology can be employed, including known so-called patch antennas, as well as slot antennas which consist of slots in a Cu-surface. If so-called patch antennas are used, these may have different form, the selection of which depends on the required characteristics.

Also, other alternatives are possible. Each radiation element or each antenna is fed with a signal of formula $A_i * \sin(\omega_i * t + \phi_1)$ where $i = 1, \ldots, n$ and A is amplitude, $\omega$ is frequency and $\phi$ phase. Each antenna gives origin to a wavefront and the total wavefront from the antenna arrangement can be controlled by tuning the frequencies in wanted values. The larger n is, the larger control flexibility is obtained. This makes it possible to be able to create just the wavefront required; as a matter of fact one can decide how the antenna beam itself should look. If for instance, antenna x (not shown) should brake down, effects of this are limited through controlling the other filters so that the beam form becomes essentially as required. Alternatively, the filters can be replaced.

Generally, there are two methods of controlling the waveform, either by means of the frequency of the control signals or phase $\phi$. Here, as a matter of fact, the control is carried out by varying the phase since the mobile stations listen to frequencies, which of course therefore cannot be changed. The intelligence itself for the control of the filters is suitably in the base station. The amplification devices $5_1, \ldots, 5_n$ consists advantageously of a discrete amplifier stage, which is a known method. In a special embodiment all controllable filters in the arrangement can be tuned in to one and the same frequency. Thereby, an antenna which amplifies a signal and which also has a high output power is obtained. Alternatively, certain filters can be tuned to the same frequency, while other are tuned in to another or different frequencies and so on.

Figure 4B:
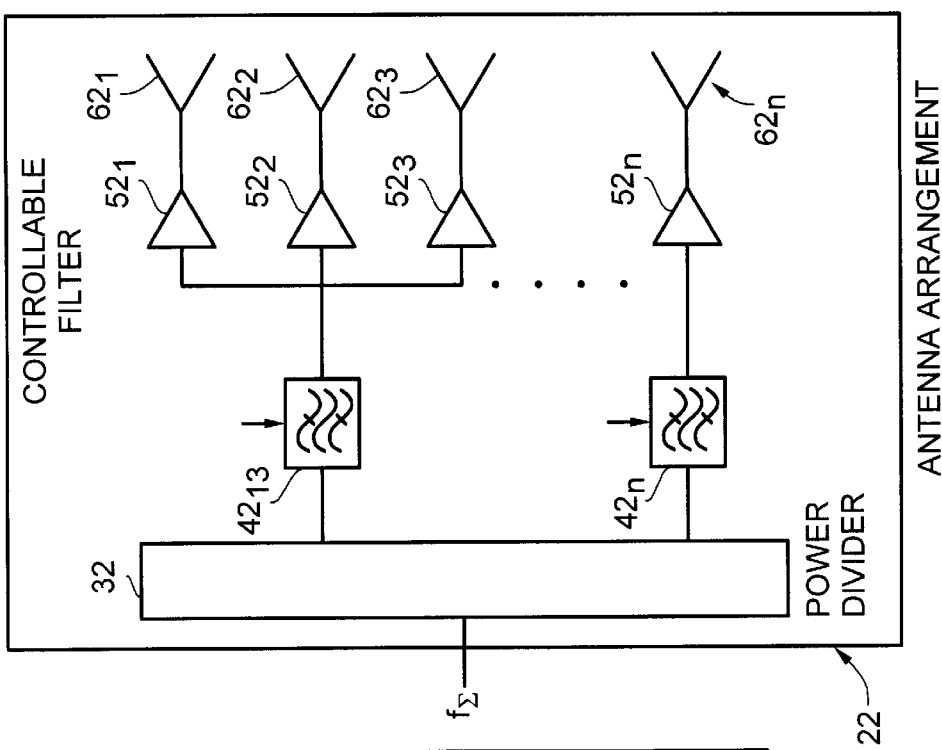
FIG. 4B is another alternative embodiment according to the invention.
Figure 4A:
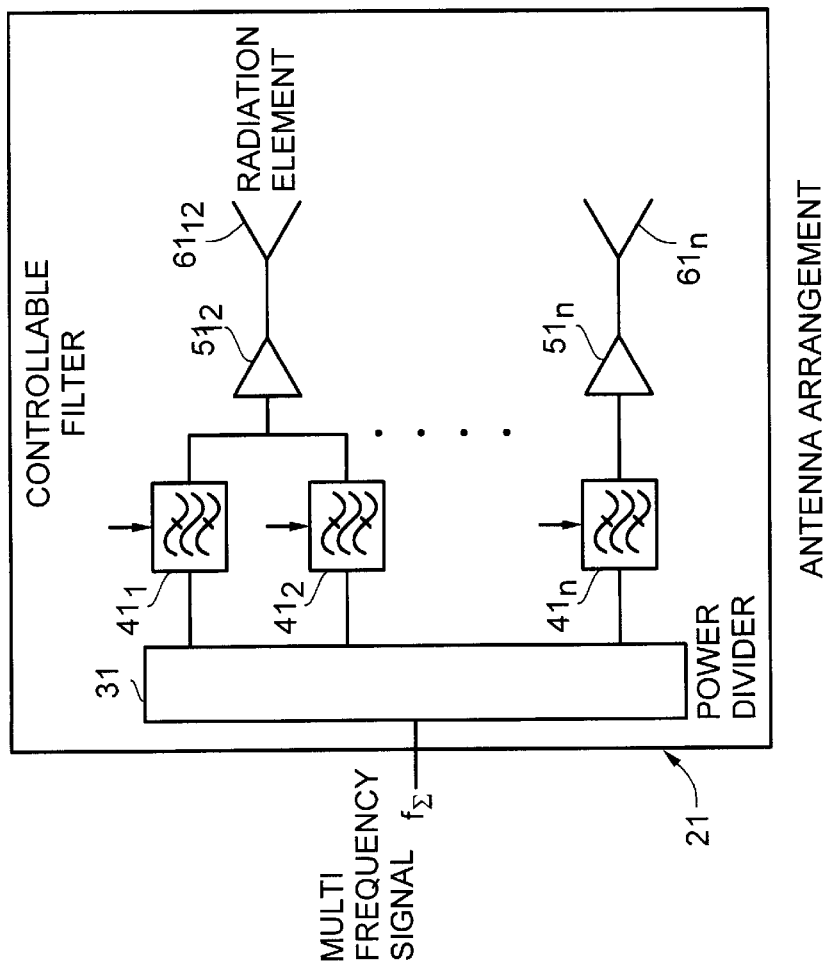
FIG. 4A is a first alternative embodiment according to the invention.

FIG. 4a shows an alternative embodiment of the invention. Only the antenna arrangement 21 is shown. The base station unit 10 is not changed. A multi-frequency signal $f_\Sigma$ is arrived to a power divider 31 where the multi-frequency signal such as one described in the proceedings is divided into a number of similar multi-frequency subsignals. These are fed to a number of controllable filters $41_1, \ldots, 41_n$. However, there are two electrically controllable filters $41_1, \ldots, 41_2$, both supplying a signal to the same amplifier $51_{12}$. However, the amplifier $5_n 1$ receives a signal from an electrically controllable filter $41_n$. This embodiment can naturally be varied in a number of ways. For instance, an amplification device can frequently be arranged for two electrically controllable filters, an amplification device for three electrically controllable filters or every conceivable combination thereof. In this case, the amplification device $51_{12}$ is slightly complicated than the previously described embodiment, since two different frequencies must be amplified and fed to the radiation elements $61_{12}$.

FIG. 4b shows another alternative embodiment of the invention where a multi-frequency signal $f_{93}$ arrives to an antenna arrangement 22. Also, in this case only the antenna arrangement is shown since the base station unit and the transmission device can basically be unchanged. In the same way as in the previous embodiment, the multi-frequency signal is divided in the power divider 32 in a number of multi-frequency subsignals, which are fed to the controllable filters $42_{13}, \ldots, 42_n$. Here, the single-frequency signal received from the filter $42_{13}$, is fed to three different amplification devices $51_1, 51_2, 51_3$, which in turn are transmit corresponding signals to the radiation elements $61_1, 61_2, 61_3$. As to the rest, the same discussion is valid with regard to FIG. 4a, ie each combination is conceivable. In the antenna arrangements 21 and 22, respectively, between the filters and amplification devices, in applicable cases, simple power combiner and power divider, respectively, are provided which however are not shown in the figure, as their function is obviously clear. Also, in these cases the frequencies can naturally be tuned in a number of different ways; for instance a number of controllable filters can be tuned in the same frequency or also all to different frequencies, all same frequencies etc.

Figure 5:
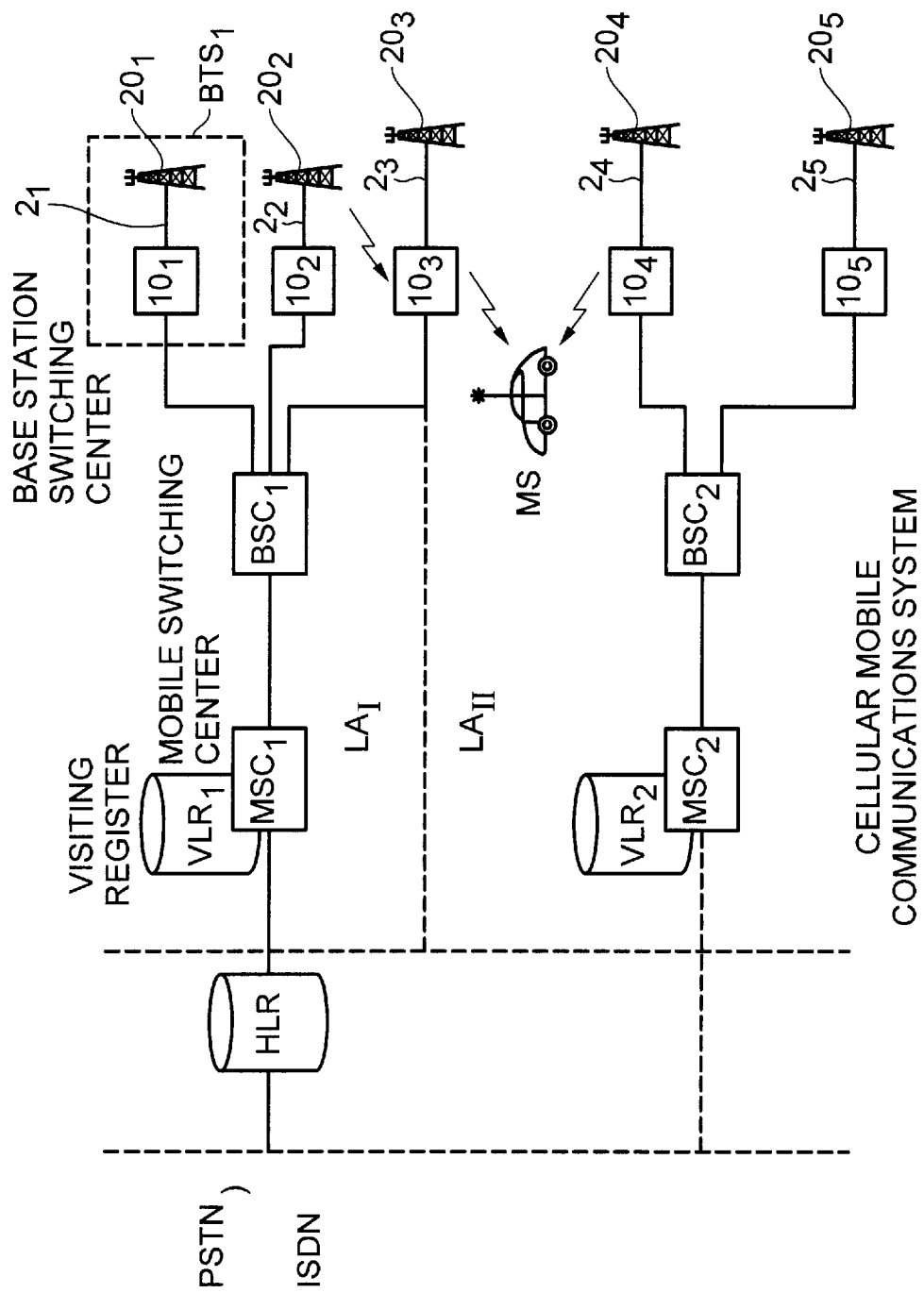
FIG. 5 schematically illustrates a cellular mobile communications system (GSM)
Figure 6:
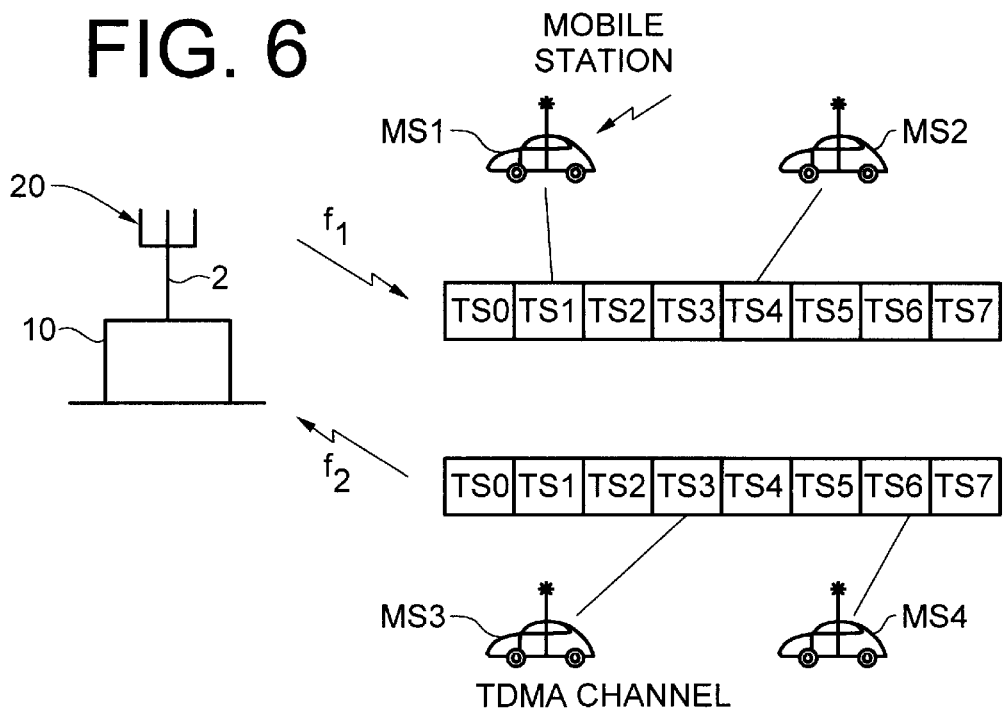
FIG. 6 illustrates TDMA channel dedication in the system according to FIG. 5.

FIG. 5 very schematically shows a cellular mobile communications system, for instance the GSM-system. Simply, it can be considered consisting of a switching system and a base station system. In the switching system, for instance a mobile switching centre $MSC_1$, $MSC_2$, visiting register $VLR_1$ $VLR_2$, home register, which is a database where the subscriber is registered and which contains subscription information and so on. The base station system in GSM consists of a number of base station switching centres $BSC_1$, $BSC_2$ to each of which a number of base transmitter stations $BTS_{1,2,3}$, and $BTS_{4,5}$, respectively, corresponds, cards usually are called base stations. The system is developed around a network of adjacent radio cells, which together present full coverage of a service area. Each cell has a BTS that acts on a set of radio channels. To avoid interference problems (see FIG. 6), these are different from the channels that are used in adjacent cells. A number of BTS are controlled in turn by a base station switching center BSC. The BSC controls functions such as handover and power supply etc. The base station switching centres $BSC_1$, $BSC_2$ are served in turn by said mobile switching centres $MSC_1$, $MSC_2$, which in a known way, in turn control the call to and form, e.g. the public network, the integrated digital service network etc. The area served by an $MSC_1/VLR$, $MSC_2/VLR_2$ is divided in number of local station area $L_1A$, $L_2A$. A localization area is the area within which a mobile station MS can move freely without providing the MSC that controls the localization area with updated localization information. A localization area can include more cells and depend on one or several BSC's but belong to one single MSC, as mentioned above. The localization area is also divided in a number of cells.

Figure 7:
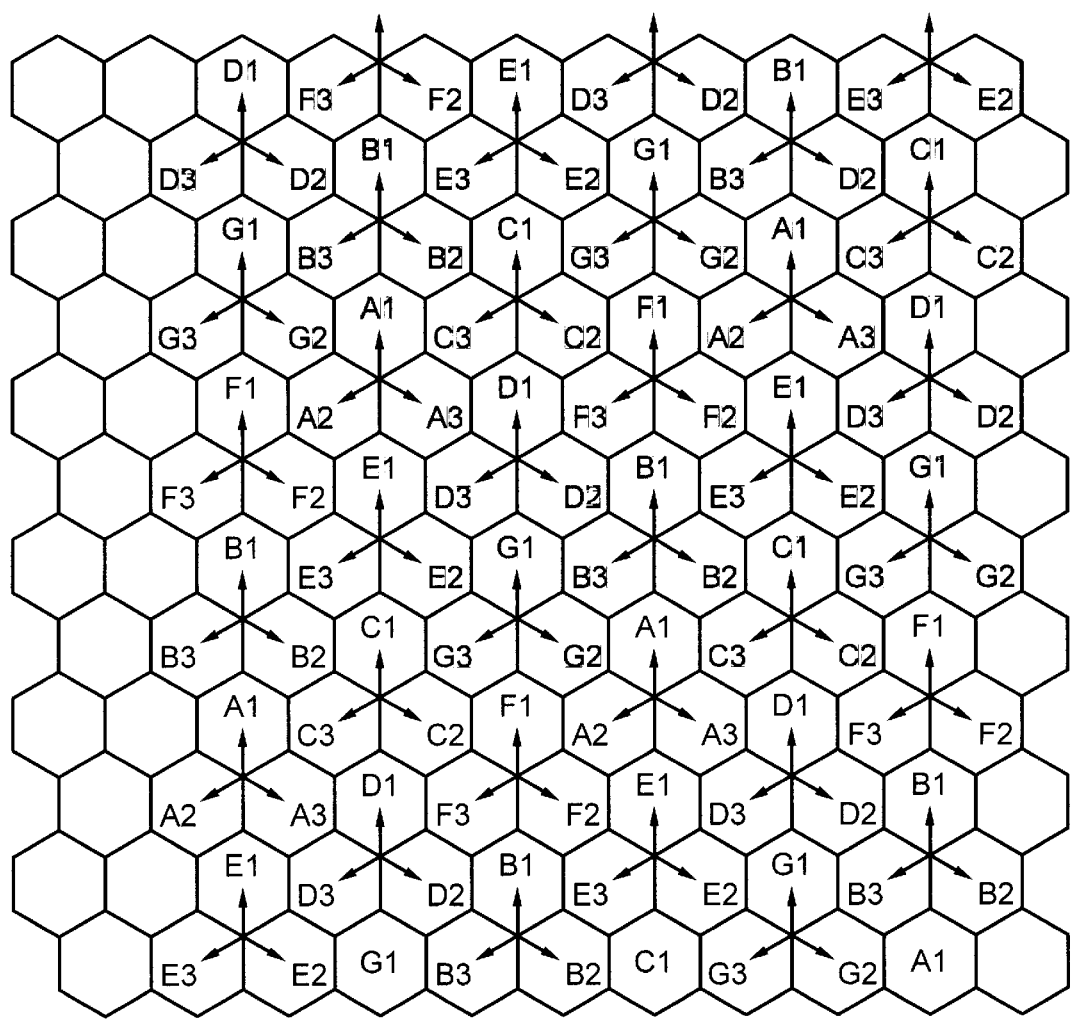
FIG. 7 very schematically illustrates an example of channel reuse which can be applied to the system according to FIG. 5, FIG. 8 very schematically illustrates an alternative cellular mobile communications system in which the invention can be applied

In a cellular system all frequencies are reused, i.e. they are used by different cells, which however do not need be to close to each other, to avoid interference problems. An example of reuse is shown in FIG. 7, which will be described later. On the radio connection, specially between the mobile station MS and BTS GSM uses time sharing multi-access, TDMA. For each frequency band 8 time slots are used. Consequently, it is 8 physical channels per carrier wave in GSM, namely channels 0–7 or the time slots 0–7. This is illustrated schematically in FIG. 6, where for instance up to 8 mobiles can use the same frequency band by using different time slots. In the figure, MS1 uses time slot 1 in the frequency band 1, while the mobile MS2 uses time slot 4 in the same frequency band at reception from BTS. Corresponding design applies to the mobiles MS3, MS4 that use the time slots 3 and 6, respectively, in the frequency band 2.

FIG. 5 shows a number of base stations (base station units) $10_1, 10_2, 10_3, 10_4, 10_5$ with corresponding antenna arrangements $20_1, 20_2, 20_3$ etc., connected through corresponding signal feed devices $22_1, 22_2, 22_3$; i.e. the devices are for instance designed, as describe above, in reference to FIGS. 3, alternatively 4a, 4b. $BTS_1$ is indicated with a dashed line, for the remaining units with index 2–5 naturally the same is valid, but for reasons of clarity, they are not indicated. As mentioned above, the frequency reuse used of radio channels on same carrier wave frequencies that covers geographically different areas. These areas must be separated from each other in such extension that no interference appears or at least not in such a degree that it is more disturbance than what can be accepted. To be able to develop a cellular system, the quotient between the level of a received required signal and the level of the received non-required signal is used, which is defined as the carrier interference quotient. This, for instance, depends on the position of the mobiles, terrain and different devices that can contribute to the distribution as well as the characteristics and types of the antennae which are used, its height, location and so on. Different frequency reuse patterns are used. In FIG. 7 schematically is shown the so-called 7/21 cell pattern. The geometry is so that there are three sector cells at each so-called site, i.e. BTS. Each cell uses 60° transmitter antennas and two 60° reception antennas and each cell substantially has the shape of a hexagon. In the so-called 7/21 pattern, 21 frequency groups in a 7 sites reuse pattern are used. However, this is only an example. Within the bold line in the figure where the frequency groups are indicated A1–A3, B1–B3, . . . , G1–G3, thus no frequencies are reused.

Figure 8:
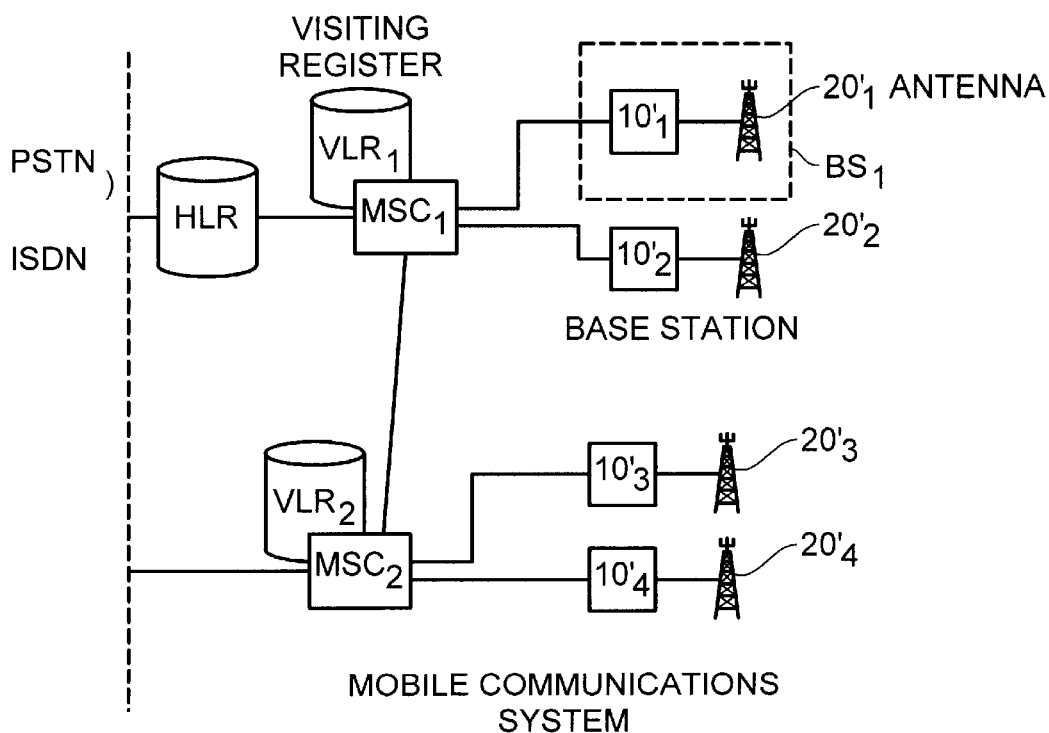

In FIG. 8 a mobile communications system similar to FIG. 5 is shown, where the base stations are however not divided in BSC's to which a number of BTS's are arranged without the base stations $BS_1, BS_2, BS_3, BS_4$ (only $BS_1$ illustrerad analogous to FIG. 5) includes function of BSC as well as BTS. Analogous to what has been said in the proceeding, the invention is also applicable in this case and the transmission of the signals between the base station units $10_1'$, $10_2', 10_3', 10_4'$ and the corresponding antenna arrangements $20_1', 20_2', 20_3', 20_4'$ is carried out as described with reference to FIG. 3, 4A, 4B.

Figure 9:
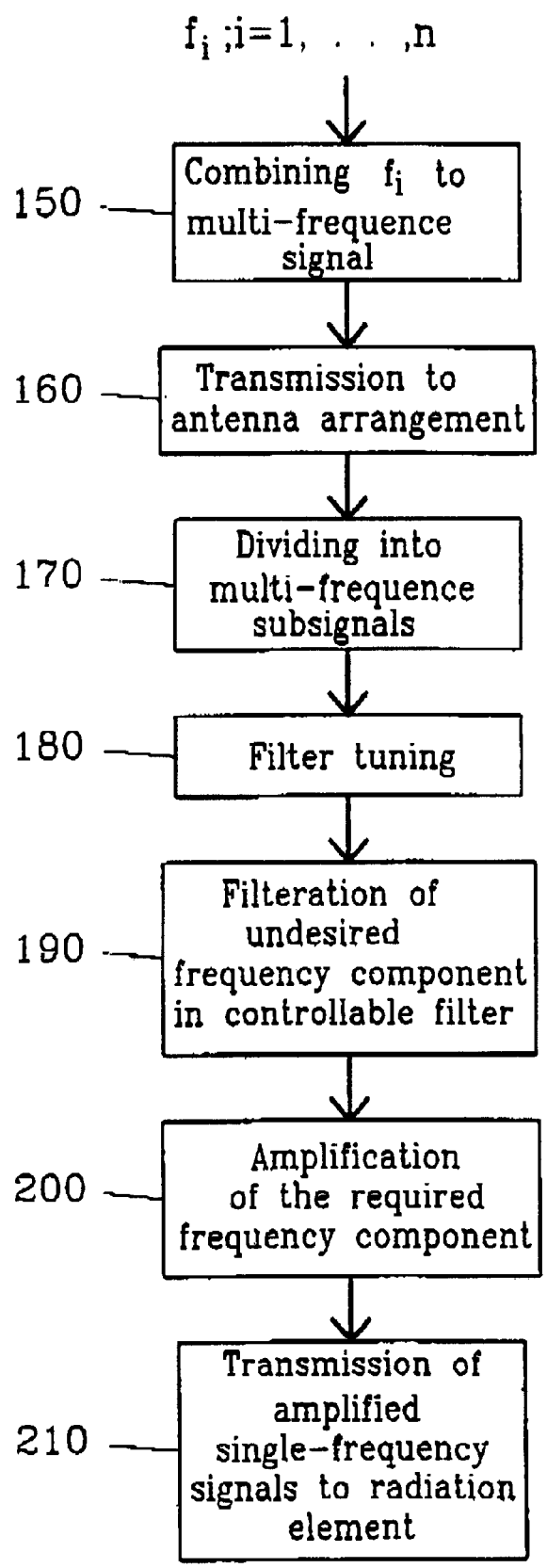
FIG. 9 shows a flowchart.

In FIG. 9 a flowchart illustrating the transmission of radio signals between the base station unit and corresponding antenna arrangement according to an embodiment is shown. In the base station unit a number of signals with different frequencies are combined in a combiner to a multi-frequency signal, 150. The multi-frequency signal is transmitted, 160, subsequently to the antenna arrangement. In this, the incoming multi-frequency signal is divided in a number of similar multi-frequency subsignals, 170, in a power divider. Then, a number of controllable filter arrangements provided in the antenna arrangement are tuned, 180, which suitably is done via the base station. How and where they are tuned can naturally be done in a suitable way. Subsequently, 190, unwanted frequency components are filtered away in each, for instance electrically controllable filter, so that a number of single-frequency signals are obtained. These are amplified subsequently, 200, in a number of amplification devices, for instance an amplification device for each of the single-frequency signal after which, 210, the amplified single-frequency signals are finally fed to each radiation element.

It is an advantage with the invention that through integration of the amplification devices and the radiation elements, it becomes possible to use controllable bandpass filters because the RF power levels are kept low. DC power performance is high depending on the low power losses between the last amplifier stage and corresponding radiation elements and depending on that single-frequency signals (i.e. essentially single-frequency signals, the signal levels for remaining components are decreased), are only, at least partly, amplified, whereby the need for use of power consuming linearization methods are avoided. Through the invention the smaller than until now known devices can be made because, for instance the complexity is lower whereby a higher integration level is made possible. Moreover, a high degree of flexibility is obtained.

Further, the invention can be varied as mentioned above in a number of ways and admits multi-frequency transmission as well as single frequency transmission through tuning of all filters to one and same frequency with high effect, such as so-called EIRP-transmission, where EIRP stands for equivalent isotropic radiated effect, which is a unit of measurement for the radiated effect from an antenna in the main direction of the antenna. EIRP is defined as the input effect multiplied with antenna gain. Furthermore, multi-frequency transmission can be combined with EIRP transmission. Advantageously, the electrically controllable filters include amplitude and/or phase regulating arrangement, which further facilitates adaptive beam formation.

The invention is not limited to shown embodiments, but can be varied freely within the scope of the claims.

What we claim is:

1. An arrangement at transmission of a number of signals, each containing a frequency component between a base station unit and an antenna arrangement includes a number of radiation elements, said arrangement includes a combiner unit arranged at the base station for combining each frequency component containing signals to a multi-frequency signal, which is transmitted to the antenna arrangement, wherein each of said antenna elements being provided for radiating a single-frequency and said antenna arrangement further including:

a power dividing unit for dividing said multi-frequency signal in a number of preferably similar multi-frequency subsignals, a number of electrically controllable filter arrangements for extracting single-frequency signals from each of at least a number of said multi-frequency subsignals, a number of amplification devices in which said single-frequency signals are amplified before feeding to said number of radiation elements.

2. The arrangement of claim 1, wherein, said combiner unit consists of a passive network.

3. The arrangement of claim 1, wherein, at least one signal feed arrangement is arranged between the base station unit and the antenna arrangement to transmit the multi-frequency signal.

4. The arrangement of claim 3, wherein, said signal feed arrangement consists of a coaxial cable.

5. The arrangement of claim 3, wherein, said signal feed arrangement consists of a waveguide.

6. The arrangement of claim 1, wherein, said dividing unit consists of a passive power divider network.

7. The arrangement of claim 1, wherein each of said electrically controllable filter arrangement being provided with a separate amplification device, in which each single-frequency signal is amplified.

8. The arrangement of claim 1, wherein, each amplification device is provided with a radiation element.

9. The arrangement of claim 1, wherein, an amplification device is common for at least two filter arrangements.

10. The arrangement of claim 1, wherein, one and same single-frequency signal is fed to more than one radiation element.

11. The arrangement of claim 1, wherein, the electrically controllable filter arrangements consist of bandpass filters.

12. The arrangement of claim 1, wherein, the radiation elements consist of dipoles.

13. The arrangement of claim 1, wherein, said radiation elements consist of microstrip devices, for example patch antennas.

14. The arrangement of claim 13, wherein, said microstrip devices are patch antennas.

15. The arrangement of claim 1, wherein, said at least some of the controllable filter arrangements are tuned in different frequencies.

16. The arrangement of claim 1, wherein, all filter arrangements are tuned into one and same frequency so that an amplified signal and high output power are obtained.

17. The arrangement of claim 15, wherein, a number of filter arrangements are also tuned in to one and same frequency and an available output power can be distributed to desired frequencies.

18. The arrangement of claim 1, wherein, said controllable filter arrangements includes means for phase.

19. The arrangement of claim 1, wherein, said controllable filter arrangements includes means for amplitude adjustment.

20. The arrangement of claim 1, wherein, said controllable filter arrangements includes means for phase and amplitude adjustment.

21. An antenna arrangement, provided as a radio base station, said antenna arrangement being provided with a multi-frequency signal, wherein at least one power dividing unit in which the multi-frequency signal is divided in a number of preferably similar multi-frequency subsignals is arranged in the antenna arrangement and said arrangement further comprising a number of electrically controllable filter arrangements, which are so controlled that from each filter arrangement a single-frequency signal of a required frequency is obtained, and at least some of said single-frequency signals are amplified separately.

22. The antenna arrangement of claim 21, wherein, said filter arrangements comprise electrically controllable filters and to each of said electrically controllable filters an amplification device is arranged in which corresponding single-frequency signals are amplified and said amplified signals are fed to a number of radiation elements.

23. The antenna arrangement of claim 1, wherein, monolithic integrated microwave circuit (MMIC) is used.

24. A base station arrangement including a base station unit including a number of transceivers, which form a transceiver arrangement, forming an interface for a number of mobile stations and an antenna arrangement in which signals are transmitted between the transceiver arrangement and the antenna arrangement via a signal transmission device, in which said base station unit further includes a power combiner unit for combining a number of signals of different frequency to a multi-frequency signal for transmission to the antenna arrangement, wherein, said antenna arrangement includes a power dividing unit in which said transmitted multi-frequency signal is divided into a number of, preferably similar, multi-frequency subsignals and by means of a number of controllable filter arrangements a number of single-frequency signals are produced by filtering, which are amplified separately and fed to a number of radiation elements.

25. The base station arrangement of claim 24, wherein, said filter arrangements include electrically controllable filters, which can be tuned in so that at least one desired signal frequency can be obtained.

26. A cellular mobile communications system in which a number of base stations are arranged, each covering one or more cells, each base station including a base station unit and an antenna arrangement for communications with mobile stations through a number of carrier wave frequencies within the cell o those cells covered by the base station, wherein said antenna arrangement includes a number of electrically controllable filter arrangements through which one or several signals having desired frequencies can be tuned in and these are amplified by means of amplification devices provided in the antenna arrangement, for feeding to radiation elements included in the antenna arrangement each of said antenna elements being provided for radiating a signle-frequency.

27. A method for transmission of a number of signals having different frequencies between a base station unit and an antenna arrangement including a number of radiation elements, said method comprising following stages:

combining signals having different frequencies in the base station unit to a multi-frequency signal, transmitting the multi-frequency signal to the antenna arrangement, said method further comprising the stages of:
  dividing said multi-frequency signal in a number of preferably equivalent multi-frequency signals, in the antenna arrangement,
  tuning a number of electrically controllable filter arrangements in such a way that a number of single-frequency signals of desired frequency are obtained,
  amplifying said single-frequency signals, and
  feeding the amplified signals to a number of radiation elements.

28. The method of claim 27, wherein, each single-frequency signal is amplified in an amplification device belonging to each filter arrangement.

29. The method of claim 27, wherein, from each amplification device an amplified single-frequency signal is transmitted to a separate radiation element.

30. The method of claim 27, wherein, each controllable filter arrangement is so tuned that more than one signal having same frequency is obtained.

* * * * *